US006645646B1

(12) United States Patent
Umeda et al.

(10) Patent No.: US 6,645,646 B1
(45) Date of Patent: *Nov. 11, 2003

(54) MAGNETIC RECORDING MEDIUM AND MAGNETIC STORAGE APPARATUS

(75) Inventors: Hisashi Umeda, Kawasaki (JP); E. Noel Abarra, Kawasaki (JP); Iwao Okamoto, Kawasaki (JP); Yoshifumi Mizoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/587,842

(22) Filed: Jun. 6, 2000

Related U.S. Application Data

(63) Continuation-in-part of application No. 09/425,788, filed on Oct. 22, 1999.

(30) Foreign Application Priority Data

Jun. 8, 1999 (JP) ............................................ 11-161329
Apr. 7, 2000 (JP) ........................................ 2000-107071

(51) Int. Cl.⁷ .............................. G11B 5/66; G11B 5/20; H01J 1/00; B32B 15/00
(52) U.S. Cl. ........................... 428/694 TS; 428/694 TS; 428/213; 428/336; 428/611; 428/668; 428/900
(58) Field of Search .................... 428/694 TM, 694 TS, 428/900, 213, 336, 694 EC, 65.3, 611, 668

(56) References Cited

U.S. PATENT DOCUMENTS

| 4,677,032 A | * | 6/1987 | Robinson | 428/611 |
| 4,789,598 A | | 12/1988 | Howard et al. | 428/408 |
| 5,051,288 A | | 9/1991 | Ahlert et al. | 428/641 |
| 5,147,732 A | | 9/1992 | Shiroishi et al. | 428/668 |

(List continued on next page.)

FOREIGN PATENT DOCUMENTS

| DE | 197 00 506 A1 | 7/1997 |
| EP | 0892393 A1 | 1/1999 |
| GB | 2355018 A | 4/2001 |
| JP | 10-040528 | 2/1978 |
| JP | 06-349047 | 12/1994 |
| JP | 07-121863 | 5/1995 |
| JP | 07-134820 | 5/1995 |
| JP | 07-176027 | 7/1995 |
| JP | 08-129738 | 5/1996 |
| JP | 09-147349 | 6/1997 |
| JP | 09-198641 | 7/1997 |
| JP | 10-149526 A | 6/1998 |
| JP | 10-289434 | 10/1998 |
| JP | 1173621 | 3/1999 |
| JP | 11328646 A | 11/1999 |
| WO | WO9624927 | 8/1996 |
| WO | WO9734295 | 9/1997 |

OTHER PUBLICATIONS

Okamoto et al.; "Rigid Disk Medium for 5 Gb/in² Recording;" *IEEE Intermag 1996 Digest*.

Hosoe et al.; "Experimental Study of Thermal Decay in High–Density Magnetic Recording Media;" *IEEE Trans. Magn.*; vol. 33, p. 1528; 1997.

(List continued on next page.)

*Primary Examiner*—Holly Rickman
(74) *Attorney, Agent, or Firm*—Greer, Burns & Crain, Ltd.

(57) ABSTRACT

A magnetic recording medium is constructed to include at least one exchange layer structure and a magnetic layer provided on the exchange layer structure, where the exchange layer structure includes a ferromagnetic layer and a non-magnetic coupling layer provided on the ferromagnetic layer, and a magnetic bonding layer provided between the ferromagnetic layer and the non-magnetic coupling layer and/or between the non-magnetic coupling layer and the magnetic layer, wherein the magnetic bonding layer has a magnetization direction parallel to the ferromagnetic layer and the magnetic layer.

26 Claims, 9 Drawing Sheets

U.S. PATENT DOCUMENTS

| | | | |
|---|---|---|---|
| 5,408,377 A | 4/1995 | Gurney et al. | 360/113 |
| 5,462,796 A | 10/1995 | Teng et al. | 428/336 |
| 5,465,185 A | 11/1995 | Heim et al. | 360/113 |
| 5,493,465 A | 2/1996 | Kamiguchi et al. | 360/113 |
| 5,523,173 A | 6/1996 | Doerner et al. | 428/611 |
| 5,580,667 A | 12/1996 | Lal et al. | 428/610 |
| 5,607,740 A | 3/1997 | Noda | 428/65.3 |
| 5,688,380 A | 11/1997 | Koike et al. | 204/192.1 |
| 5,693,426 A | 12/1997 | Lee et al. | 428/611 |
| 5,701,223 A | 12/1997 | Fontana, Jr. et al. | 360/113 |
| 5,756,202 A | 5/1998 | Van Kesteren et al. | 428/332 |
| 5,834,111 A | 11/1998 | Lal et al. | 428/332 |
| 5,840,394 A | 11/1998 | Ranjan et al. | 428/65.3 |
| 5,843,569 A | 12/1998 | Kaitsu et al. | 428/323 |
| 5,851,643 A | 12/1998 | Honda et al. | 428/212 |
| 5,851,656 A | 12/1998 | Ohkubo | 428/332 |
| 5,898,549 A | 4/1999 | Gill | 360/113 |
| 5,922,456 A | 7/1999 | Tanahashi et al. | 428/332 |
| 6,013,365 A | 1/2000 | Dieney et al. | 428/332 |
| 6,077,586 A | 6/2000 | Bian et al. | 428/65.3 |
| 6,143,388 A | 11/2000 | Bian et al. | 428/65.3 |
| 6,150,016 A | 11/2000 | Song et al. | 428/332 |
| 6,221,481 B1 | 4/2001 | Wu et al. | 428/332 |
| 6,248,395 B1 | 6/2001 | Homola | 427/129 |
| 6,280,813 B1 * | 8/2001 | Carey et al. | 428/65.3 |
| 2001/0038931 A1 | 11/2001 | Carey et al. | 428/694 |

OTHER PUBLICATIONS

Lu et al.; "Thermal Instability at 10 Gb/in$^2$ Magnetic Recording;" *IEEE Trans. Magn.*; vol. 30, No. 6, pp. 4230–4232; Nov. 1994.

Abarra et al.; "Thermal Stability of Narrow Track Bits in a 5 Gb/in$^2$ Medium;" *IEEE Trans. Magn.*; vol. 33, p. 2995; 1997.

He et al.; "High–Speed Switching in Magnetic Recording Media;" *Journal of Magnetism and Magnetic Materials*; vol. 155, pp. 6–12; 1996.

Akimoto et al.; "Relationship Between Magnetic Circumferential Orientation and Magnetic Thermal Stability;" *J. Magn. Magn. Mater.*; 1999.

Abarra et al.; "The Effect of Orientation Ratio on the Dynamic Coercivity of Media for >15 5 Gb/in$^2$ Recording;" EB–02, *Intermag.*; Korea; 1999.

Richter et al.; "Dynamic Coercivity Effects in Thin Film Media;" *IEEE Trans. Magn.*, vol. 34, p. 1540; 1997.

Lu et al.; "Magnetic Viscosity in High–Density Recording;" *J. Appl. Phys.*, vol. 75, p. 5768; 1994.

S.S.P. Parkin; "Systematic Variation of the Strength and Oscillation Period of Indirect Magnetic Exchange Coupling Through the 3d, 4d, and 5d Transition Metals;" *Phys. Rev. Lett.*, Vol 67, p. 3598; 1991.

Pu–Ling Lu and Stanley H. Charap; "High Density Magnetic Recording Media Design and Identification: Susceptibility to Thermal Decay;" *IEEE Transactions on Magnetics*, vol. 31, No. 6; Nov. 1995.

Y. Kawato et al.; "Spin Valve Films with Synthetic Ferrimagnets (Co/Ru/Co) for Pinned Layers;" (source and year unknown).

Baibich et al., "*Giant Magnetoresistance of (001)Fe(001)CR Magnetic Superlattices*," Physical Review Letters, vol. 61, No. 21, Nov. 21, 1988.

Akopyan et al., "Study Of A Change In The Lattice Constant Of A Ruthenium–Based Ternary Solid Solution By Mathematical Planning Of An Experiment," Izv. Akad. Nauk SSR, Met., (1976) (3), 210–214.

Ounadjela et al., "Field–Dependent Antiferro–Ferromagnetic Transition In Co/Ru Superlattices," J. Appl. Phys., Nov. 15, 1991, vol. 70, Issue 10, p. 5877.

Lambert et al., "Reduction of Media Noise in Thin Film Metal Media by Lamination," IEEE Transactions on Magnetics, vol. 26, No. 5, Sep. 1990, pp. 2706–2708.

Murdock et al., "Noise Properties of Multilayered Co–Alloy Magnetic Recording Media," IEEE Transactions on Magnetics, vol. 26, No. 5, Sep. 1990, pp. 2700–2705.

Murayama et al., "Interlayer Exchange Coupling in Co/Cr/Co Double–Layered Recording Films Studied by SpinWave Brillouin Scattering," IEEE Transactions on Magnetics, vol. 27, No. 6, Nov. 1991, pp. 5064–5066.

Lambert et al., "Laminated Media for High Density Recording," IEEE Transactions on Magnetics, vol. 29, No. 1, Jan. 1993, pp. 223–229.

Teng et al., "Flash Chromium Interlayer for High Performance Disks with Superior Noise and Coercivity Squareness," IEEE Transactions on Magnetics (1993), pp. 3679–3681.

Parkin et al., "Oscilliations in Exchange Coupling and Magnetoresistance in Metallic Superlattice Structures: Co/Ru, Co/Cr, and Fe/Cr," Physical Review Letters, vol. 64, No. 19, May 7, 1990, pp. 2304–2307.

* cited by examiner

MAGNETIC RECORDING MEDIUM AND MAGNETIC STORAGE APPARATUS

This application is a Continuation-In-Part Application of a U.S. patent application Ser. No. 09/425,788 filed Oct. 22, 1999.

BACKGROUND OF THE INVENTION

1. Field of the Invention

The present invention generally relates to magnetic recording media and magnetic storage apparatuses, and more particularly to a magnetic recording medium and a magnetic storage apparatus which are suited for high-density recording.

2. Description of the Related Art

Due to the development of the information processing technology, there are increased demands for high-density magnetic recording media. Characteristics required of the magnetic recording media to satisfy such demands include low noise, high coercivity, high remanence magnetization, and high resolution in the case of a hard disk, for example.

The recording density of longitudinal magnetic recording media, such as magnetic disks, has been increased considerably, due to the reduction of medium noise and the development of magnetoresistive and high-sensitivity spin-valve heads. A typical magnetic recording medium is comprised of a substrate, an underlayer, a magnetic layer, and a protection layer which are successively stacked in this order. The underlayer is made of Cr or a Cr-based alloy, and the magnetic layer is made of a Co-based alloy.

Various methods have been proposed to reduce the medium noise. For example, Okamoto et al., "Rigid Disk Medium For 5 Gbit/in$^2$ Recording", AB-3, Intermag '96 Digest proposes decreasing the grain size and size distribution of the magnetic layer by reducing the magnetic layer thickness by the proper use of an underlayer made of CrMo, and a U.S. Pat. No. 5,693,426 proposes the use of an underlayer made of NiAl. Further, Hosoe et al., "Experimental Study of Thermal Decay in High-Density Magnetic Recording Media", IEEE Trans. Magn. Vol. 33, 1528 (1997), for example, proposes the use of an underlayer made of CrTiB. The underlayers described above also promote c-axis orientation of the magnetic layer in a plane which increases the remanence magnetization and the thermal stability of written bits. In addition, proposals have been made to reduce the thickness of the magnetic layer, to increase the resolution or to decrease the width of transition between written bits. Furthermore, proposals have been made to decrease the exchange coupling between grains by promoting more Cr segregation in the magnetic layer which is made of the CoCr-based alloy.

However, as the grains of the magnetic layer become smaller and more magnetically isolated from each other, the written bits become unstable due to thermal activation and to demagnetizing fields which increase with linear density. Lu et al., "Thermal Instability at 10 Gbit/in$^2$ Magnetic Recording", IEEE Trans. Magn. Vol. 30, 4230 (1994) demonstrated, by micromagnetic simulation, that exchange-decoupled grains having a diameter of 10 nm and ratio $K_u V/k_B T \sim 60$ in 400 kfci di-bits are susceptible to significant thermal decay, where $K_u$ denotes the magnetic anisotropy constant, V denotes the average magnetic grain volume, $k_B$ denotes the Boltzmann constant, and T denotes the temperature. The ratio $K_u V/k_B T$ is also referred to as a thermal stability factor.

It has been reported in Abarra et al., "Thermal Stability of Narrow Track Bits in a 5 Gbit/in$^2$ Medium", IEEE Trans. Magn. Vol. 33, 2995 (1997) that the presence of intergranular exchange interaction stabilizes written bits, by MFM studies of annealed 200 kfci bits on a 5 Gbit/in$^2$ CoCrPtTa/CrMo medium. However, more grain decoupling is essential for recording densities of 20 Gbit/in$^2$ or greater.

The obvious solution has been to increase the magnetic anisotropy of the magnetic layer. But unfortunately, the increased magnetic anisotropy places a great demand on the head write field which degrades the "overwrite" performance which is the ability to write over previously written data.

In addition, the coercivity of thermally unstable magnetic recording medium increases rapidly with decreasing switching time, as reported in He et al., "High Speed Switching in Magnetic Recording Media", J. Magn. Magn. Mater. Vol. 155, 6 (1996), for magnetic tape media, and in J. H. Richter, "Dynamic Coercivity Effects in Thin Film Media", IEEE Trans. Magn. Vol. 34, 1540 (1997), for magnetic disk media. Consequently, the adverse effects are introduced in the data rate, that is, how fast data can be written on the magnetic layer and the amount of head field required to reverse the magnetic grains.

On the other hand, another proposed method of improving the thermal stability increases the orientation ratio of the magnetic layer, by appropriately texturing the substrate under the magnetic layer. For example, Akimoto et al., "Relationship Between Magnetic Circumferential Orientation and Magnetic Thermal Stability", J. Magn. Magn. Mater. (1999), in press, report through micromagnetic simulation, that the effective ratio $K_u V/k_B T$ is enhanced by a slight increase in the orientation ratio. This further results in a weaker time dependence for the coercivity which improves the overwrite performance of the magnetic recording medium, as reported in Abarra et al., "The Effect of Orientation Ratio on the Dynamic Coercivity of Media for >15 Gbit/in$^2$ Recording", EB-02, Intermag '99, Korea.

Furthermore, keepered magnetic recording media have been proposed for thermal stability improvement. The keeper layer is made up of a magnetically soft layer parallel to the magnetic layer. This soft layer can be disposed above or below the magnetic layer. Oftentimes, a Cr isolation layer is interposed between the soft layer and the magnetic layer. The soft layer reduces the demagnetizing fields in written bits on the magnetic layer. However, coupling the magnetic layer to a continuously-exchanged coupled soft layer defeats the purpose of decoupling the grains of the magnetic layer. As a result, the medium noise increases.

Various methods have been proposed to improve the thermal stability and to reduce the medium noise. However, there was a problem in that the proposed methods do not provide a considerable improvement of the thermal stability of written bits, thereby making it difficult to greatly reduce the medium noise. In addition, there was another problem in that some of the proposed methods introduce adverse effects on the performance of the magnetic recording medium due to the measures taken to reduce the medium noise.

More particularly, in order to obtain a thermally stable performance of the magnetic recording medium, it is conceivable to (i) increase the magnetic anisotropy constant $K_u$, (ii) decrease the temperature T or, (iii) increase the grain volume V of the magnetic layer. However, measure (i) increases the coercivity, thereby making it more difficult to write information on the magnetic layer. In addition, measure (ii) is impractical since in magnetic disk drives, for example, the operating temperature may become greater than 60° C. Furthermore, measure (iii) increases the medium noise as described above. As an alternative for measure (iii), it is conceivable to increase the thickness of the magnetic layer, but this would lead to deterioration of the resolution.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium and a magnetic storage apparatus, which can improve the thermal stability of written bits without increasing the medium noise, so as to enable a reliable high-density recording without introducing adverse effects on the performance of the magnetic recording medium, that is, unnecessarily increasing the magnetic anisotropy.

Still another object of the present invention is to provide a magnetic recording medium comprising at least one exchange layer structure and a magnetic layer provided on the exchange layer structure, the exchange layer structure including a ferromagnetic layer and a non-magnetic coupling layer provided on the ferromagnetic layer, and a magnetic bonding layer provided between the ferromagnetic layer and the non-magnetic coupling layer and/or between the non-magnetic coupling layer and the magnetic layer, the magnetic bonding layer having a magnetization direction parallel to the ferromagnetic layer and the magnetic layer. According to the magnetic recording medium of the present invention, it is possible to provide a magnetic recording medium which can improve the thermal stability of written bits, so as to enable reliable high-density recording without degrading the overwrite performance.

The magnetic bonding layer may be made of a material different from those of the ferromagnetic layer and the magnetic layer. A different material may have the same material composition but with a different material content ratio.

An upper magnetic bonding layer and a lower magnetic bonding layer may be respectively provided above and below the non-magnetic coupling layer, and in this case, an exchange coupling between the upper magnetic bonding layer and the lower magnetic bonding layer is desirably larger than an exchange coupling between the magnetic layer and the ferromagnetic layer.

The non-magnetic coupling layer may be made of a material selected from a group of Ru, Rh, Ir, Cr, Cu, Ru-based alloys, Rh-based alloys. Ir-based alloys, Cr-based alloys and Cu-based alloys.

The magnetization directions of the ferromagnetic layer and the magnetic layer may be mutually antiparallel or mutually parallel.

In the case of the mutually antiparallel magnetization directions, the non-magnetic coupling layer desirably has a thickness in a range of approximately 0.4 to 1.0 nm when made of a material selected from a group of Ru, Rh, Ir, Cr, Ru-based alloys, Rh-based alloys, Ir-based alloys and Cr-based alloys, and has a thickness in a range of approximately 1.5 to 2.1 nm when made of a material selected from a group of Cu and Cu-based alloys.

In the case of mutually parallel magnetization directions, the non-magnetic coupling layer desirably has a thickness in a range of approximately 0.2 to 0.4 nm and 1.0 to 1.7 nm when made of a material selected from a group of Ru, Rh, Ir, Cu, Ru-based alloys, Rh-based alloys, Ir-based alloys and Cu-based alloys, and has a thickness in a range of approximately 1.0 to 1.4 nm and 2.6 to 3.0 nm when made of a material selected from a group of Cr and Cr-based alloys.

The ferromagnetic layer may be made of a material selected from a group of Co, Ni, Fe, Ni-based alloys, Fe-based alloys, and Co-based alloys including CoCrTa, CoCrPt and CoCrPt—M, where M=B, Mo, Nb, Ta, W, Cu or alloys thereof. The ferromagnetic layer may have a thickness in a range of approximately 2 to 10 nm.

The magnetic bonding layer may be made of a material selected from a group of Co, Fe, Fe-based alloys, Ni-based alloys, and Co-based alloys including CoCrTa, CoCrPt and CoCrPt—M, where M=B, Mo, Nb, Ta, W, Cu or alloys thereof.

The Co or Fe concentration of the magnetic bonding layer is preferably higher than the Co or Fe concentrations of the ferromagnetic layer and the magnetic layer. If Co or Fe is used for the ferromagnetic layer or the magnetic layer, the magnetic bonding layer may be omitted. When providing the magnetic bonding layer, the material used for the magnetic bonding layer is preferably in reverse to that used for the ferromagnetic layer or the magnetic layer, that is, Fe or Co is used for the magnetic bonding layer.

When Ru, Rh, Ir, Cu, Ru-based alloys, Rh-based alloys, Ir-based alloys or Cu-based alloys are used for the non-magnetic coupling layer, Co, Co-based alloys or NiFe is desirably used for the magnetic bonding layer. In addition, the magnetic bonding layer is desirably made of Fe or Fe-based alloys when the non-magnetic coupling layer is made of Cr or Cr-based alloys. The magnetic bonding layer may have a thickness in a range of approximately 1 to 5 nm.

The magnetic layer may be made of a material selected from a group of Co, Ni, Fe, Ni-based alloys, Fe-based alloys, and Co-based alloys including CoCrTa, CoCrPt and CoCrPt—M, where M=B, Mo, Nb, Ta, W, Cu or alloys thereof. The magnetic layer may have a thickness of approximately 5 to 30 nm.

The magnetic recording medium may further comprise a substrate and an underlayer provided above the substrate, such that the exchange layer structure is provided above the underlayer. Furthermore, the magnetic recording medium may further comprise a non-magnetic intermediate layer provided between the underlayer and the exchange layer structure, where the non-magnetic intermediate layer is made of a CoCr—M alloy having a hcp structure and a thickness of approximately 1 to 5 nm, where M=B, Mo, Nb, Ta, W, Cu or alloys thereof. Moreover, the magnetic recording medium may further comprise a seed layer provided between the substrate and the underlayer. The seed layer may be made of NiP which may or may not be mechanically textured, and may or may not be oxidized. In addition, the seed layer may be made of an alloy having a B2 structure such as NiAl and FeAl.

The magnetic recording medium may further comprise at least a first exchange layer structure and a second exchange layer structure provided between the first exchange layer structure and the magnetic layer, where the second exchange layer structure has a ferromagnetic layer with a magnetic anisotropy smaller than that of a ferromagnetic layer of the first exchange layer structure, and the first and second exchange layer structures have ferromagnetic layers with magnetization directions which are mutually antiparallel.

The magnetic recording medium may further comprise at least a first exchange layer structure and a second exchange layer structure provided between the first exchange layer structure and the magnetic layer, where the second exchange layer structure has a ferromagnetic layer with a remanence magnetization and thickness product smaller than that of a ferromagnetic layer of the first exchange layer structure, and the first and second exchange layer structures have ferromagnetic layers with magnetization directions which are mutually antiparallel.

A further object of the present invention is to provide a magnetic storage apparatus comprising at least one magnetic recording medium of any of the types described above. According to the magnetic storage apparatus of the present invention, it is possible to provide a magnetic recording medium which can improve the thermal stability of written bits, so as to enable reliable high-density recording without degrading the overwrite performance.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention.

The present invention submits the use of layers with antiparallel magnetization structures. For example, S. S. P. Parkin, "Systematic Variation of the Strength and Oscillation Period of Indirect magnetic Exchange Coupling through the 3d, 4d, and 5d Transition Metals", Phys. Rev. Lett. Vol. 67, 3598 (1991) describes several magnetic transition metals such as Co, Fe and Ni that are coupled through thin non-magnetic interlayers such as Ru and Rh. On the other hand, a U.S. Pat. No. 5,701,223 proposes a spin-valve which employs the above described layers as laminated pinning layers to stabilize the sensor.

For a particular Ru or Ir layer thickness between two ferromagnetic layers, the magnetizations can be made parallel or antiparallel. For example, for a structure made up of two ferromagnetic layers of different thickness with antiparallel magnetizations, the effective grain size of a magnetic recording medium can be increased without significantly affecting the resolution. A signal amplitude reproduced from such a magnetic recording medium is reduced due to the opposite magnetizations, but this can be rectified by adding another layer of appropriate thickness and magnetization direction, under the laminated magnetic layer structure, to thereby cancel the effect of one of the layers. As a result, it is possible to increase the signal amplitude reproduced from the magnetic recording medium, and to also increase the effective grain volume. Thermally stable written bits can therefore be realized.

The present invention increases the thermal stability of written bits by exchange coupling the magnetic layer to another ferromagnetic layer with an opposite magnetization or, by a laminated ferrimagnetic structure. The ferromagnetic layer or the laminated ferrimagnetic structure is made up of exchange-decoupled grains as the magnetic layer. In other words, the present invention uses an exchange pinning ferromagnetic layer or a ferrimagnetic multilayer to improve the thermal stability performance of the magnetic recording medium.

Figure 1:
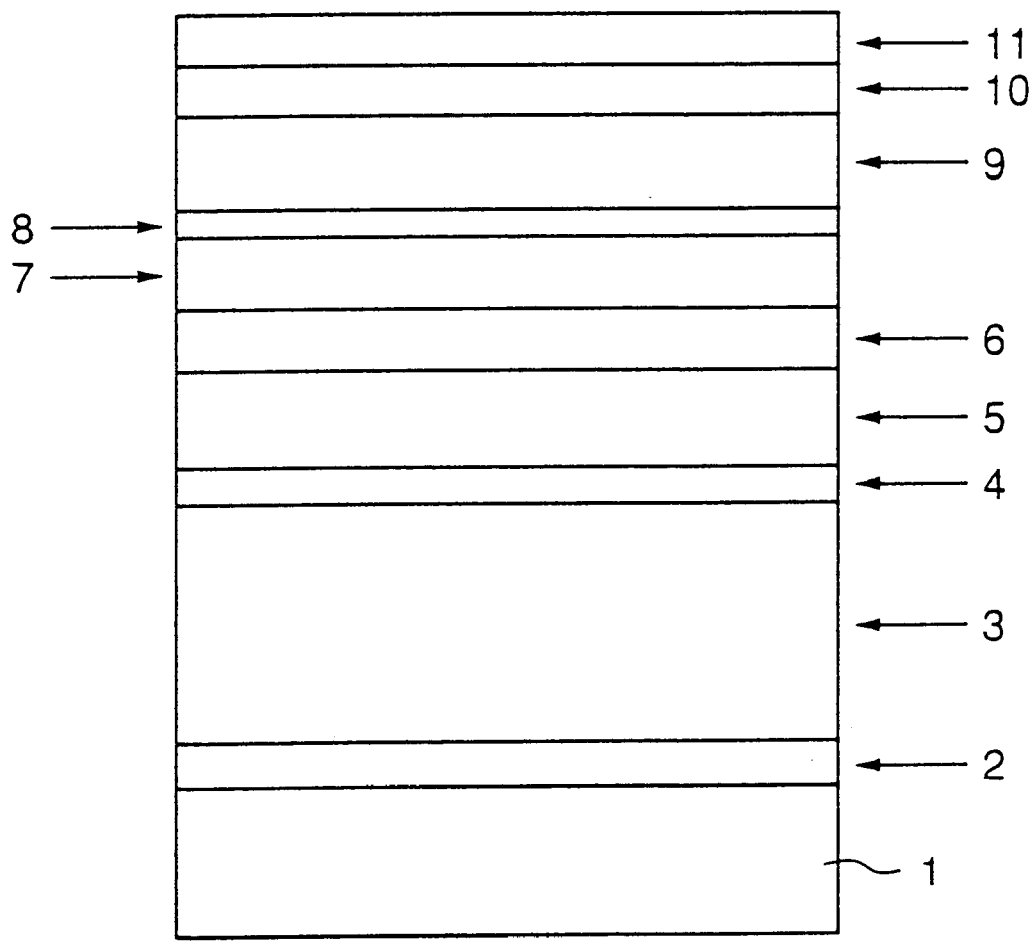
FIG. 1 is a cross sectional view showing an important part of a first embodiment of the magnetic recording medium according to the present invention.

FIG. 1 is a cross sectional view showing an important part of a first embodiment of a magnetic recording medium according to the present invention.

The magnetic recording medium includes a non-magnetic substrate 1, a first seed layer 2, a NiP layer 3, a second seed layer 4, an underlayer 5, a non-magnetic intermediate layer 6, a ferromagnetic layer 7, a non-magnetic coupling layer 8, a magnetic layer 9, a protection layer 10, and a lubricant layer 11 which are stacked in the order shown in FIG. 1.

For example, the non-magnetic substrate 1 is made of Al, Al alloy or glass. This non-magnetic substrate 1 may or may not be mechanically textured. The first seed layer 2 is made of Cr or Ti, for example, especially in the case where the non-magnetic substrate 1 is made of glass. The NiP layer 3 is preferably oxidized and may or may not be mechanically textured. The second seed layer 4 is provided to promote a (001) or a (112) texture of the underlayer 5 when using a B2 structure alloy such as NiAl and FeAl for the underlayer 5. The second seed layer 4 is made of an appropriate material similar to that of the first seed layer 2.

In a case where the magnetic recording medium is a magnetic disk, the mechanical texturing provided on the non-magnetic substrate 1 or the NiP layer 3 is made in a circumferential direction of the disk, that is, in a direction in which tracks of the disk extend.

The non-magnetic intermediate layer 6 is provided to further promote epitaxy, narrow the grain distribution of the magnetic layer 9, and orient the anisotropy axes of the magnetic layer 9 along a plane parallel to the recording surface of the magnetic recording medium. This non-magnetic intermediate layer 6 is made of a hcp structure alloy such as CoCr—M, where M=B, Mo, Nb, Ta, W, Cu or alloys thereof, and has a thickness in a range of 1 to 5 nm.

The ferromagnetic layer 7 is made of Co, Ni, Fe, Co-based alloy, Ni-based alloy, Fe-based alloy or the like. In other words, alloys such as CoCrTa, CoCrPt and CoCrPt—M, where M=B, Mo, Nb, Ta, W, Cu or alloys thereof may be used for the ferromagnetic layer 7. This ferromagnetic layer 7 has a thickness in a range of 2 to 10 nm. The non-coupling magnetic layer 8 is made of Ru, Ir, Rh, Cr, Cu, Ru-based alloy, Ir-based alloy, Rh-based alloy, Cr-based alloy, Cu-based alloy or the like. This non-magnetic coupling layer 8 preferably has a thickness in a range of 0.4 to 1.0 nm for antiparallel coupling using Ru, and preferably approximately 0.8 nm for antiparallel coupling using Ru. For this particular thickness range of the nonmagnetic coupling layer 8, the magnetizations of the ferromagnetic layer 7 and the magnetic layer 9 are antiparallel. The ferromagnetic layer 7 and the non-magnetic coupling layer 8 form an exchange layer structure.

The magnetic layer 9 is made of Co or a Co-based alloys such as CoCrTa, CoCrPt and CoCrPt—M, where M=B, Mo, Nb, Ta, W, Cu or alloys thereof. The magnetic layer 9 has a thickness in a range of 5 to 30 nm. Of course, the magnetic layer 9 is not limited to a single-layer structure, and a multilayer structure may be used for the magnetic layer 9.

The protection layer 10 is made of C, for example. In addition, the lubricant layer 11 is made of an organic lubricant, for example, for use with a magnetic transducer such as a spin-valve head. The protection layer 10 and the lubricant layer 11 form a protection layer structure on the recording surface of the magnetic recording medium.

Obviously, the layer structure under the exchange layer structure is not limited to that shown in FIG. 1. For example, the underlayer 5 may be made of Cr or Cr-based alloy and formed to a thickness in a range of 5 to 40 nm on the substrate 1, and the exchange layer structure may be provided on this underlayer 5.

Next, a description will be given of a second embodiment of the magnetic recording medium according to the present invention.

Figure 2:
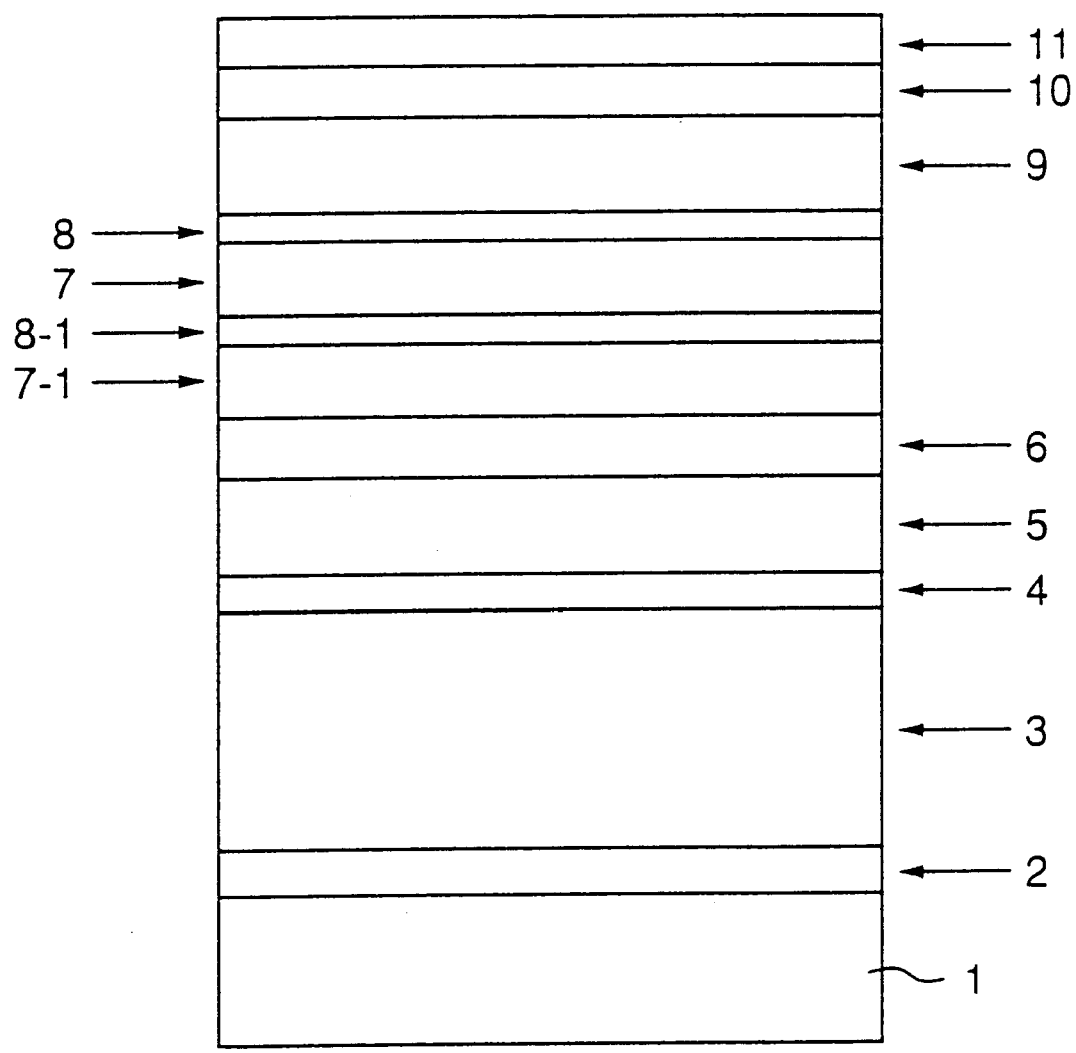
FIG. 2 is a cross sectional view showing an important part of a second embodiment of the magnetic recording medium according to the present invention.

FIG. 2 is a cross sectional view showing an important part of the second embodiment of the magnetic recording medium. In FIG. 2, those parts which are the same as those corresponding parts in FIG. 1 are designated by the same reference numerals, and a description thereof will be omitted.

In this second embodiment of the magnetic recording medium, the exchange layer structure includes two non-magnetic coupling layers 8 and 8-1, and two ferromagnetic layers 7 and 7-1, which form a ferrimagnetic multilayer. This arrangement increases the effective magnetization and signal, since the magnetizations of the two non-magnetic coupling layers 8 and 8-1 cancel each other instead of a portion of the magnetic layer 9. As a result, the grain volume and thermal stability of magnetization of the magnetic layer 9 are effectively increased. More bilayer structures made up of the pair of ferromagnetic layer and non-magnetic coupling layer may be provided additionally to increase the effective grain volume, as long as the easy axis of magnetization are appropriately oriented for the subsequently provided layers.

The ferromagnetic layer 7-1 is made of a material similar to that of ferromagnetic layer 7, and has a thickness range selected similarly to the ferromagnetic layer 7. In addition, the non-magnetic coupling layer 8-1 is made of a material similar to that of the non-magnetic coupling layer 8, and has a thickness range selected similarly to the non-magnetic coupling layer 8. Within the ferromagnetic layers 7-1 and 7, the c-axes are preferably in-plane and the grain growth columnar.

In this embodiment, the magnetic anisotropy of the ferromagnetic layer 7-1 is preferably higher than that of the ferromagnetic layer 7. However, the magnetic anisotropy of the ferromagnetic layer 7-1 may be the same as or, be higher than that of, the magnetic layer 9.

Furthermore, a remanence magnetization and thickness product of the ferromagnetic layer 7 may be smaller than that of the ferromagnetic layer 7-1.

Figure 3:
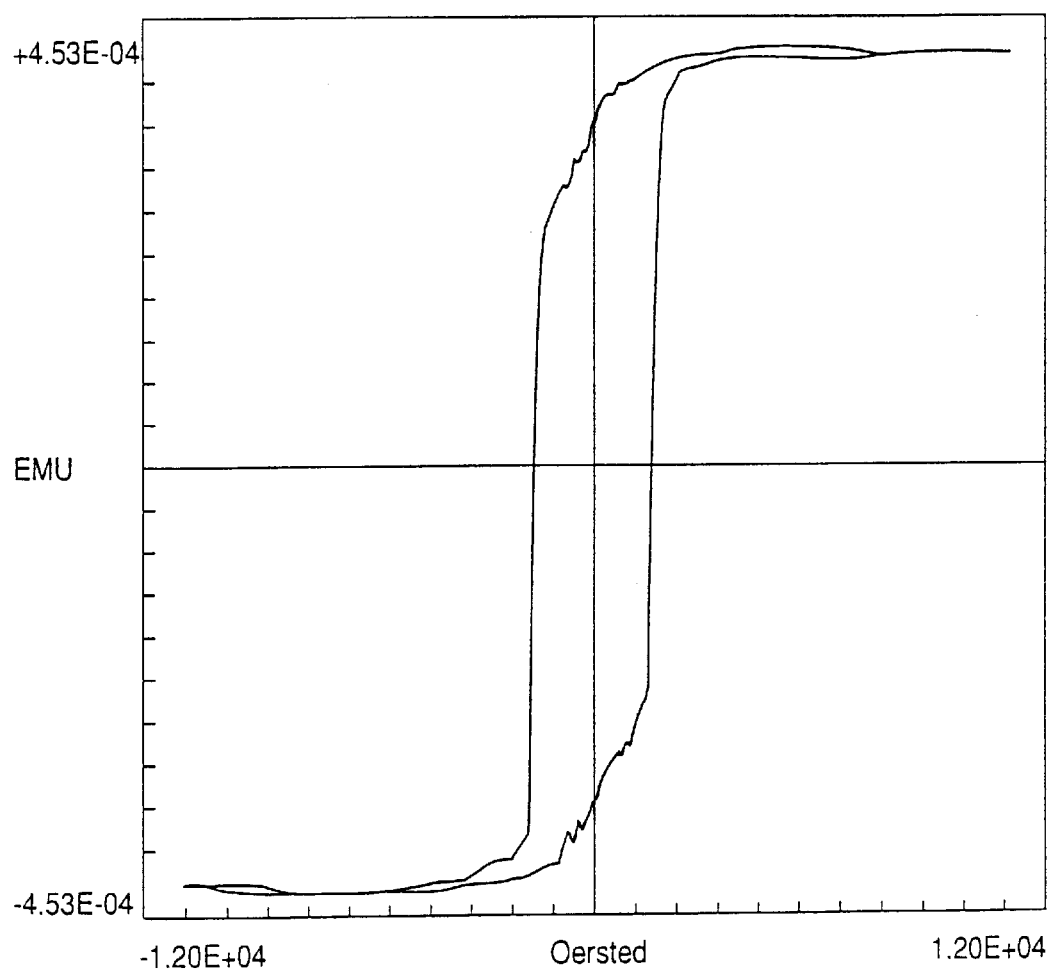
FIG. 3 is a diagram showing an in-plane magnetization curve of a single CoPt layer having a thickness of 10 nm on a Si substrate.

FIG. 3 is a diagram showing an in-plane magnetization curve of a single CoPt layer having a thickness of 10 nm on a Si substrate. In FIG. 3, the ordinate indicates the magnetization (emu), and the abscissa indicates the magnetic field (Oe). Conventional magnetic recording media show a behavior similar to that shown in FIG. 3.

Figure 4:
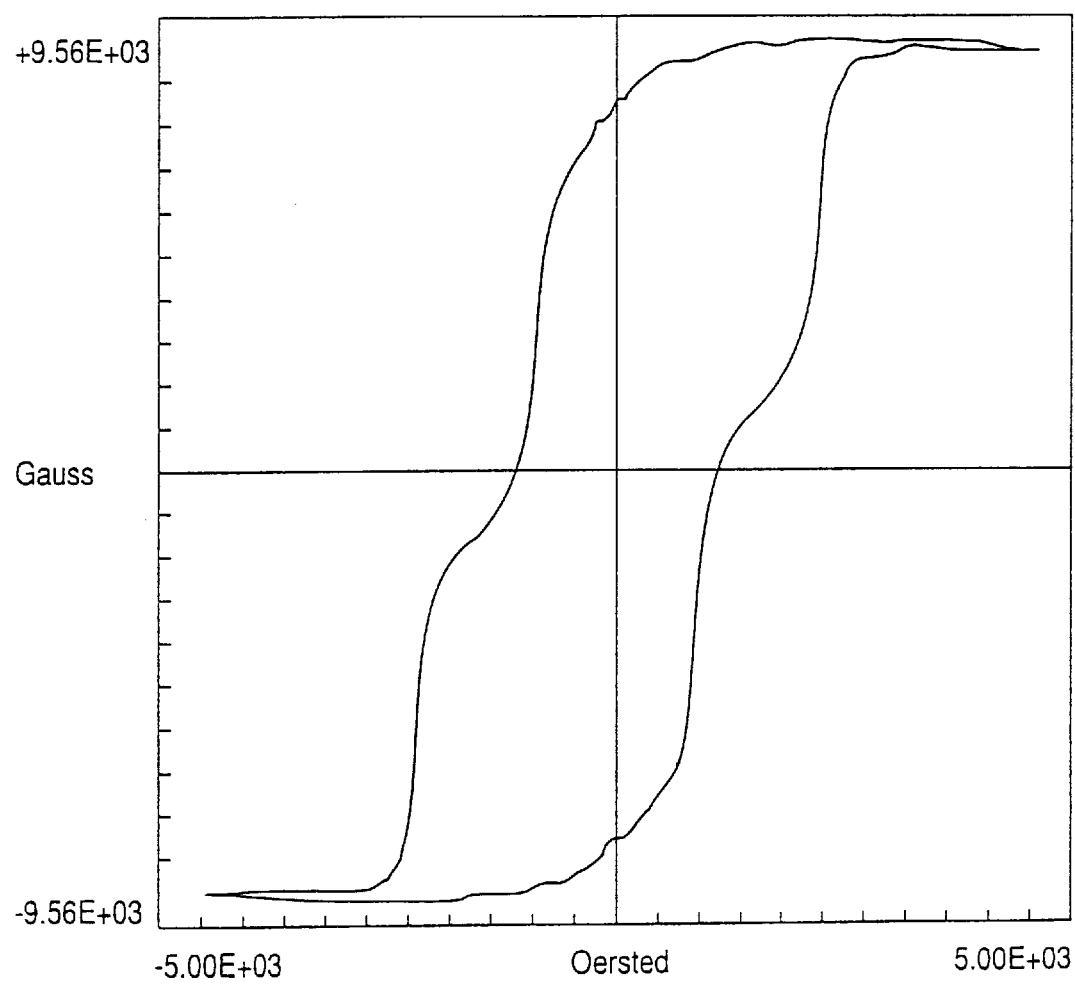
FIG. 4 is a diagram showing an in-plane magnetization curve of two CoPt layers separated by a Ru layer having a thickness of 0.8 nm.

FIG. 4 is a diagram showing an in-plane magnetization curve of two CoPt layers separated by a Ru layer having a thickness of 0.8 nm, as in the case of the first embodiment of the magnetic recording medium. In FIG. 4, the ordinate indicates the magnetization (Gauss), and the abscissa indicates the magnetic field (Oe). As may be seen from FIG. 4, the loop shows shifts near the magnetic field which indicate the antiparallel coupling.

Figure 5:
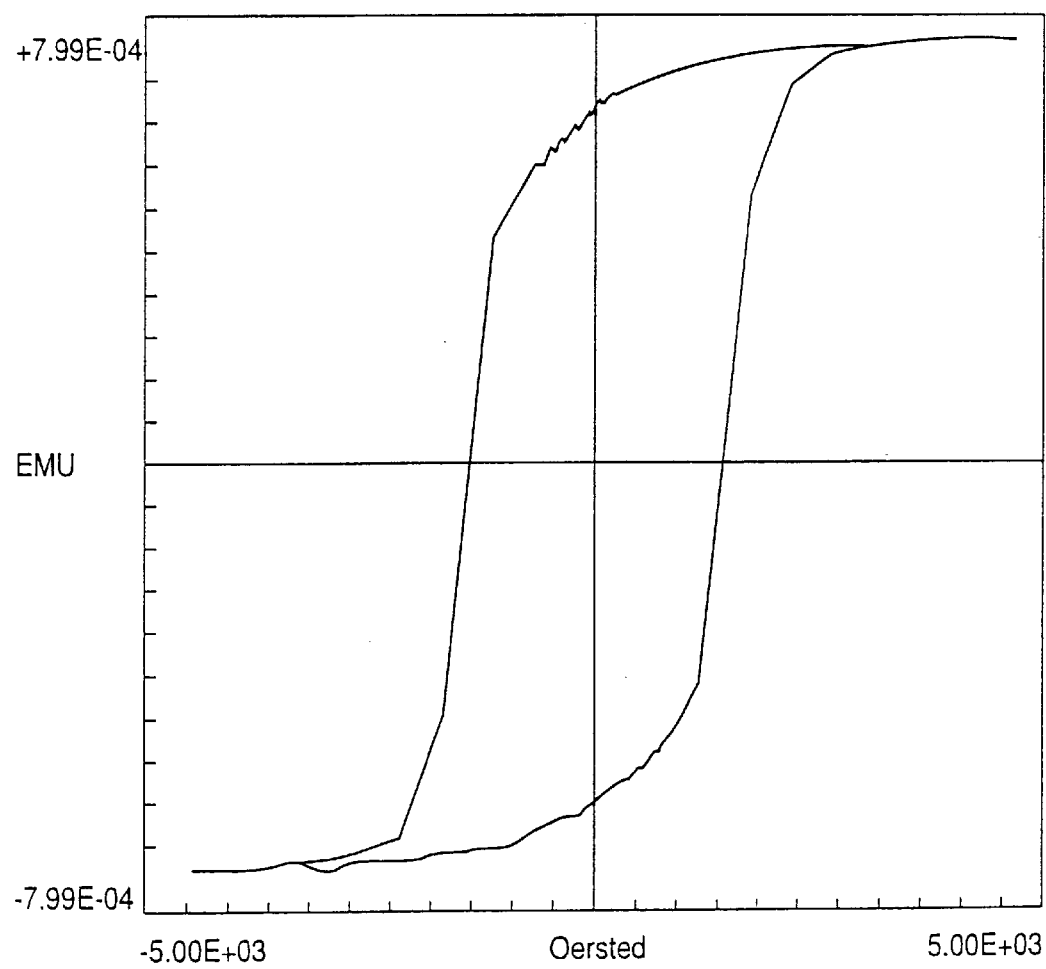
FIG. 5 is a diagram showing an in-plane magnetization curve of two CoPt layers separated by a Ru layer having a thickness of 1.4 nm.

FIG. 5 is a diagram showing an in-plane magnetization curve of two CoPt layers separated by a Ru layer having a thickness of 1.4 nm. In FIG. 5, the ordinate indicates the magnetization (emu), and the abscissa indicates the magnetic field (Oe). As may be seen from FIG. 5, the magnetizations of the two CoPt layers are parallel.

Figure 6:
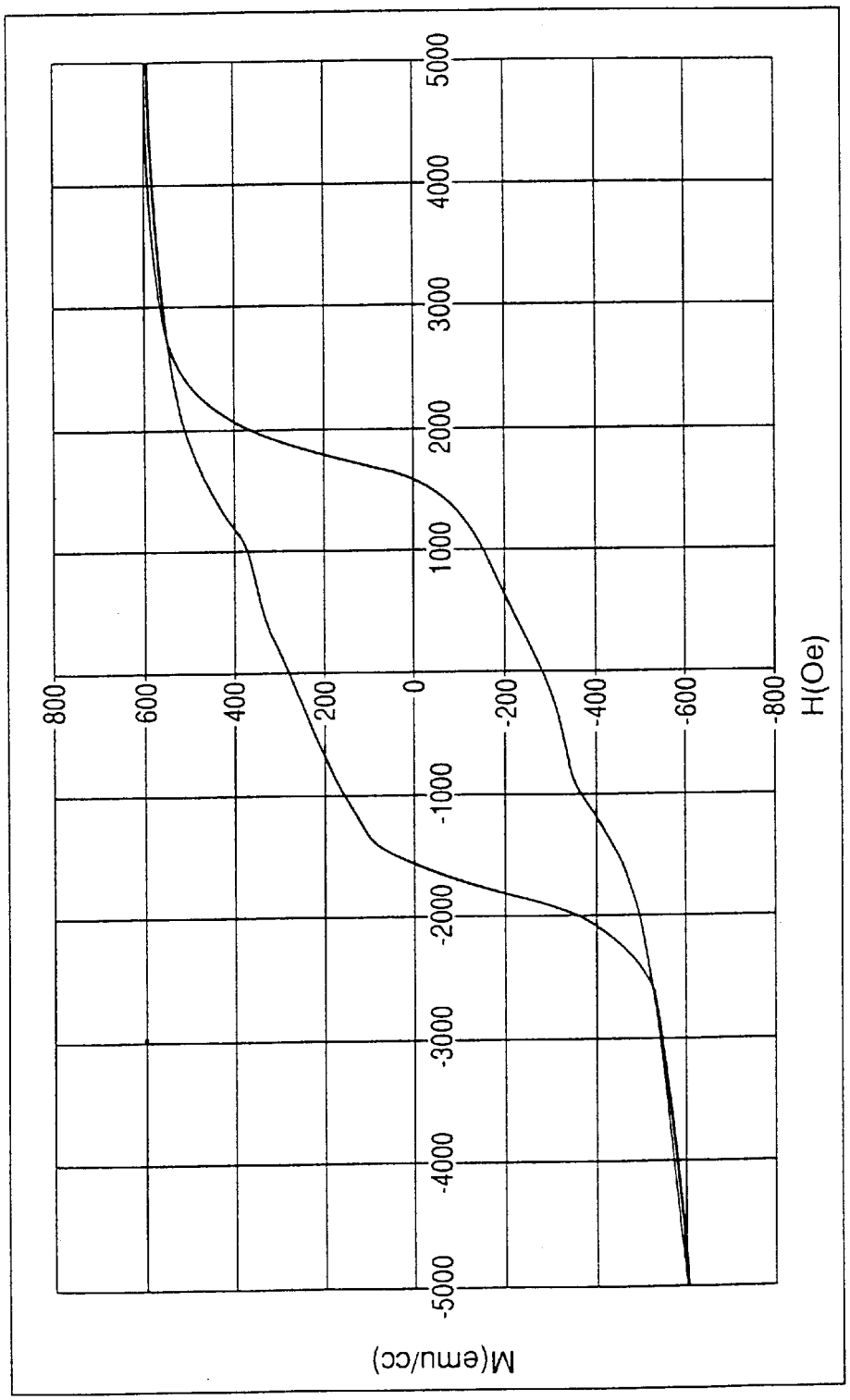
FIG. 6 is a diagram showing an in-plane magnetization curve two CoCrPt layers separated by a Ru having a thickness of 0.8 nm.

FIG. 6 is a diagram showing an in-plane magnetization curve for two CoCrPt layers separated by a Ru having a thickness of 0.8 nm, as in the case of the second embodiment of the magnetic recording medium. In FIG. 6, the ordinate indicates the magnetization (emu/cc), and the abscissa indicates the field (Oe). As may be seen from FIG. 6, the loop shows shifts near the field which indicate the antiparallel coupling.

From FIGS. 3 and 4, it may be seen that the antiparallel coupling can be obtained by the provision of the exchange layer structure. In addition, it may be seen by comparing FIG. 5 with FIGS. 4 and 6, the non-magnetic coupling layer 8 is desirably in the range of 0.4 to 1.0 nm in order to achieve the antiparallel coupling.

Therefore, according to the first and second embodiments of the magnetic recording medium, it is possible to effectively increase the apparent grain volume of the magnetic layer by the exchange coupling provided between the magnetic layer and the ferromagnetic layer via the non-magnetic coupling layer, without sacrificing the resolution. In other words, the apparent thickness of the magnetic layer is increased with regard to the grain volume of the magnetic layer so that a thermally stable medium can be obtained, and in addition, the effective thickness of the magnetic layer is maintained since cancellation of signals especially from the bottom layers is achieved. This allows higher linear density recording that is otherwise not possible for thick media. As a result, it is possible to obtain a magnetic recording medium with reduced medium noise and thermally stable performance.

Next, a description will be given of a third embodiment of the magnetic recording medium according to the present invention. In this third embodiment, a magnetic bonding layer is further provided at least between the ferromagnetic layer and the non-magnetic coupling layer or, between the magnetic layer and the non-magnetic coupling layer of the first or second embodiment described above. In this third embodiment, the magnetic bonding layer is additionally provided to increase the exchange coupling effect, so as to further improve the thermal stability.

Figure 7:
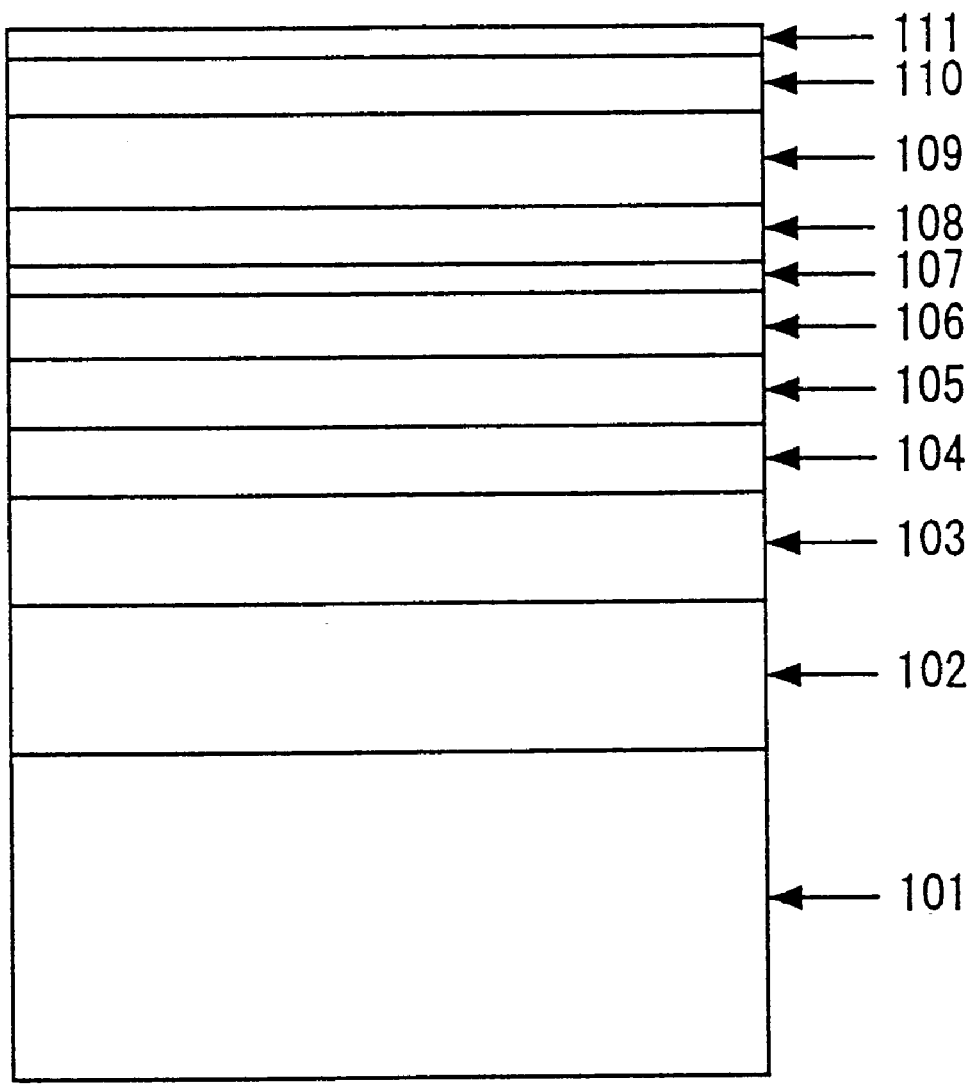
FIG. 7 is a cross sectional view showing an important part of a third embodiment of the magnetic recording medium according to the present invention.

FIG. 7 is a cross sectional view showing an important part of the third embodiment of the magnetic recording medium according to the present invention.

The magnetic recording medium includes a non-magnetic substrate 101, a seed layer 102, an underlayer 103, a non-magnetic intermediate layer 104, a ferromagnetic layer 105, a lower magnetic bonding layer 106, a non-magnetic coupling layer 107, an upper magnetic bonding layer 108, a magnetic layer 109, a protection layer 110, and a lubricant layer 111 which are stacked in this order as shown in FIG. 7.

Although two magnetic bonding layers are provided in this embodiment, it is possible to provide only one of the upper and lower magnetic bonding layers 108 and 106. When both the upper and lower magnetic bonding layers 108 and 106 are provided, the exchange coupling effects of the upper and lower magnetic bonding layers 108 and 106 are set so as to be greater than the exchange coupling effects of the magnetic layer 109 and the ferromagnetic layer 105. By setting the exchange coupling effects of the upper and lower magnetic bonding layers 108 and 106 in this manner, the exchange coupling strength is increased above and below the non-magnetic coupling layer 107, so that the thermal stability of the magnetic recording medium is improved.

If only one magnetic bonding layer is provided, the exchange coupling strength is increased between the lower magnetic bonding layer 106 and the magnetic layer 109 or, between the upper magnetic bonding layer 108 and the ferromagnetic layer 105, thereby improving the thermal stability of the magnetic recording medium.

For example, the non-magnetic substrate 101 is made of Al, Al alloy or glass. The non-magnetic substrate 101 may or may not be mechanically textured.

The seed layer 102 is made of NiP, for example, especially in the case where the non-magnetic substrate 101 is made of Al or Al alloy. The NiP seed layer 102 may or may not be oxidized and may or may not be mechanically textured. Especially in the case where the non-magnetic substrate 101 is made of glass, the seed layer 102 is made of an alloy having the B2 structure and selected from a group of materials including NiAl and FeAl, for example. The seed layer 102 is provided to promote a (001) or a (112) texture of the underlayer 103.

In a case where the magnetic recording medium is a magnetic disk, the mechanical texturing provided on the non-magnetic substrate 101 or the NiP seed layer 102 is made in a circumferential direction of the disk, that is, in a direction in which tracks of the disk extend.

The non-magnetic intermediate layer 104 is provided to further promote epitaxy, narrow the grain distribution width of the magnetic layer 109, and orient the anisotropy axes of the magnetic layer 109 along a plane parallel to the recording surface of the magnetic recording medium. This non-magnetic intermediate layer 104 is made of a hcp structure alloy such as CoCr—M, where M=B, Mo, Nb, Ta, W, Cu or alloys thereof, and has a thickness in a range of 1 to 5 nm.

The ferromagnetic layer 105 is made of Co, Ni, Fe, Co-based alloys, Ni-based alloys, Fe-based alloys or the like. In other words, Co-based alloys such as CoCrTa, CoCrPt and CoCrPt—M, where M=B, Mo, Nb, Ta, W, Cu or alloys thereof may be used for the ferromagnetic layer 105.

The lower magnetic bonding layer 106 is made of Co, Fe, Co-based alloys, Fe-based alloys or the like. In other words, Co-based alloys such as CoCrTa, CoCrPt and CoCrPt—M may be used for the lower magnetic bonding layer 106, where M B, Mo, Nb, Ta, W, Cu or alloys thereof. The Co concentration or Fe concentration of the lower magnetic bonding layer 106 is desirably higher than the Co concentration or Fe concentration of the ferromagnetic layer 105. The lower magnetic bonding layer 106 has a thickness in a range of approximately 1 to 5 nm.

In a case where Co or Fe is used for the ferromagnetic layer 105, it is possible to omit the lower magnetic bonding layer 106. On the other hand, when providing the lower magnetic bonding layer 106, Fe or Co is used in reverse to the ferromagnetic layer 105.

The non-magnetic coupling layer 107 is made of Ru, Rh, Ir, Cr, Cu, Ru-based alloys, Rh-based alloys, Ir-based alloys, Cr-based alloys, Cu-based alloys or the like. For example, when the non-magnetic coupling layer 107 is made of Ru, the thickness of the non-magnetic coupling layer 107 is set in a range of approximately 0.4 to 1.0 nm, and preferably to approximately 0.8 nm. By setting the thickness of the non-magnetic coupling layer 107 to such a range, the magnetizations of the ferromagnetic layer 105 and the magnetic layer 109 become antiparallel.

The upper magnetic bonding layer 108 is made of a material similar to that of the lower magnetic bonding layer 106. In addition, the Co concentration or Fe concentration of the upper magnetic bonding layer 108 is preferably higher than the Co concentration or Fe concentration of the magnetic layer 109. The upper magnetic bonding layer 108 has a thickness in a range of approximately 1 to 5 nm. In a case where Co or Fe is used for the magnetic layer 109, it is possible to omit the upper magnetic bonding layer 108. On the other hand, when providing the upper magnetic bonding layer 108, Fe or Co is used in reverse to the magnetic layer 109.

When using Ru, Rh, Ir, Cu, Ru-based alloys, Rh-based alloys, Ir-based alloys or Cu-based alloys for the non-magnetic coupling layer 107, it is desirably to use Co, Co-based alloys or NiFe for the upper and lower magnetic bonding layers 108 and 106. On the other hand, when using Cr or Cr-based alloys for the non-magnetic coupling layer 107, it is desirable to use Fe or Fe-based alloys for the upper and lower magnetic bonding layers 108 and 106.

The ferromagnetic layer 105 and the non-magnetic coupling layer 107 form the basic exchange layer structure. The upper and lower magnetic bonding layers 108 and 106 which are provided above and below the non-magnetic coupling layer 107 have the function of increasing the exchange coupling effects of the exchange layer structure.

The magnetic layer 109 is made of Co or Co-based alloys such as CoCrTa, CoCrPt and CoCrPt—M, where M=B, Mo, Nb, Ta, W, Cu or alloys thereof. The magnetic layer 109 has a thickness in a range of 5 to 30 nm. Of course, the magnetic layer 109 is not limited to a single-layer structure, and a multi-layer structure may be used for the magnetic layer 109.

The protection layer 110 and the lubricant layer 111 are similar to those of the first and second embodiments described above. Obviously, the layer structure under the exchange layer structure is not limited to that shown in FIG. 7. For example, the underlayer 103 may be made of Cr or Cr-based alloys and formed to a thickness in a range of 5 to 40 nm on the substrate 101, and the exchange layer structure may be provided on this underlayer 103.

Figure 8:
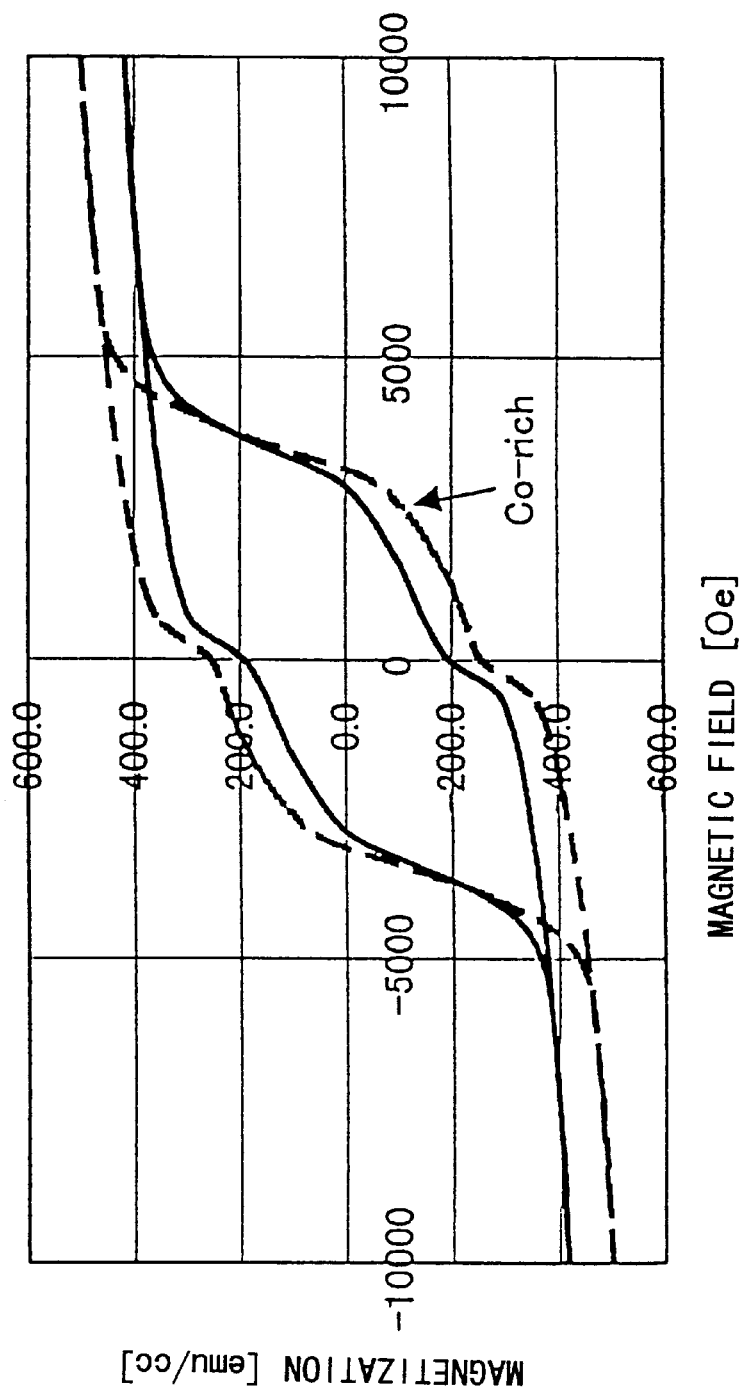
FIG. 8 is a diagram for explaining in-plane characteristics of two CoCr-based alloy layers separated by Ru.

FIG. 8 is a diagram showing the in-plane characteristic of two CoCr-based alloy layers separated by Ru, for a case where a seed layer, an underlayer, a non-magnetic intermediate layer, a ferromagnetic layer, a Ru non-magnetic coupling layer, a CoCr-based alloy magnetic layer are successively stacked in this order on a glass substrate.

It is assumed that the same CoCr-based alloy is used for the ferromagnetic layer and the magnetic layer. In FIG. 8, two loops are shown for different concentrations of Co and Cr, but the layer structure and compositions other than Co and Cr are the same for the two loops. In FIG. 8, the ordinate indicates the magnetization (emu/cc), and the abscissa indicates the magnetic field (Oe).

As may be seen from FIG. 8, a shift occurs in both the two loops in the vicinity of the ordinate, verifying the generation of the anti-ferromagnetic coupling. Furthermore, it may be seen from FIG. 8 that the loop indicated by the dashed line for the higher concentration of Co (Co-rich) has the larger coercivity. Even in the case of the conventional magnetic recording medium having no exchange layer structure, the coercivity is improved by approximately 400 Oe for the magnetic layer with the high Co concentration as compared to the magnetic layer with the low Co concentration. Since the loop shift occurs when a sum of the externally applied magnetic field and the magnetic field caused by the anti-ferromagnetic coupling introduced between the magnetic layer and the ferromagnetic layer becomes equal to the coercivity, a difference between the loop shift position and the coercivity becomes the strength of the anti-ferromagnetic exchange coupling. In FIG. 8, the loop shifts occur approximately at the same magnetic field position, but it may be seen that the exchange coupling is larger for the Co-rich case indicated by the dashed line due to a difference in coercivities between the two cases. In addition, the aspect ratio of the Co-rich loop is better than the other loop.

Therefore, by using a Co-rich alloy for the magnetic bonding layer, it is possible to increase the exchange coupling effect and realize a magnetic recording medium having a further improved thermal stability.

Figure 9:
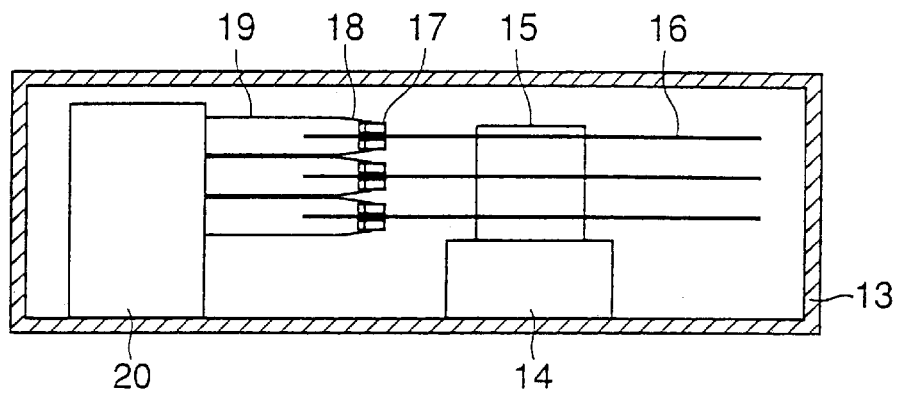
FIG. 9 is a cross sectional view showing an important part of an embodiment of the magnetic storage apparatus according to the present invention.

Next, a description will be given of an embodiment of a magnetic storage apparatus according to the present invention, by referring to FIGS. 9 and 10. FIG. 9 is a cross sectional view showing an important part of this embodiment of the magnetic storage apparatus, and FIG. 10 is a plan view showing the important part of this embodiment of the magnetic storage apparatus.

Figure 10:
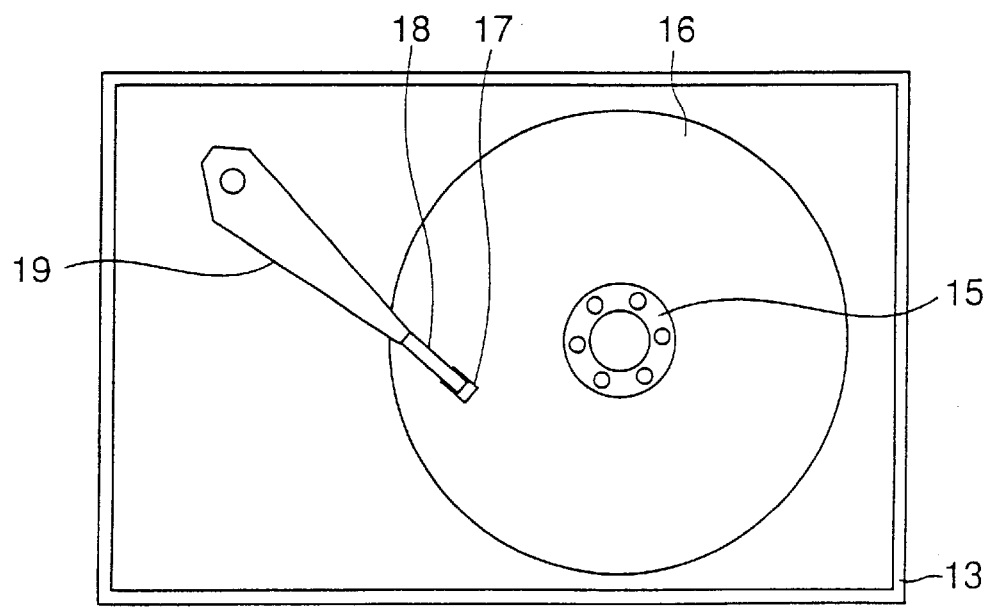
FIG. 10 is a plan view showing the important part of the embodiment of the magnetic storage apparatus.

As shown in FIGS. 9 and 10, the magnetic storage apparatus generally includes a housing 13. A motor 14, a hub 15, a plurality of magnetic recording media 16, a plurality of recording and reproducing heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of the first through third embodiments of the magnetic recording medium described above in conjunction with FIGS. 1, 2 and 7. Of course, the number of magnetic recording media 16 is not limited to three, and only one, two or four or more magnetic recording media 16 may be provided.

The basic construction of the magnetic storage unit is not limited to that shown in FIGS. 9 and 10. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:
at least one exchange layer structure and a magnetic layer provided on the exchange layer structure, said exchange layer structure including a ferromagnetic layer and a non-magnetic coupling layer provided on the ferromagnetic layer;
a lower magnetic bonding layer provided between the ferromagnetic layer and the non-magnetic coupling layer; and
an upper magnetic bonding layer provided between the non-magnetic coupling layer and the magnetic layer,
wherein said upper and lower magnetic bonding layers are made of a material selected from a group consisting of Fe, Fe alloys, Ni alloys, and Co alloys,
said upper and lower magnetic bonding layers have magnetization directions respectively parallel to the ferromagnetic layer and the magnetic layer, and
a Co or Fe concentration of the upper magnetic bonding layer is higher than that of the magnetic layer, and a Co or Fe concentration of the lower magnetic bonding layer is higher than that of the ferromagnetic layer, so that an exchange coupling between the upper and lower magnetic bonding layers is larger than an exchange coupling between the magnetic layer and the ferromagnetic layer.

2. The magnetic recording medium as claimed in claim 1, wherein said magnetic bonding layer is made of a material different from those of the ferromagnetic layer and the magnetic layer.

3. The magnetic recording medium as claimed in claim 1, wherein said non-magnetic coupling layer is made of a material selected from a group consisting of Ru, Rh, Ir, Cr, Cu, Ru alloys, Rh alloys, Ir alloys, Cr alloys and Cu alloys.

4. The magnetic recording medium as claimed in claim 1, wherein magnetization directions of the ferromagnetic layer and the magnetic layer are mutually antiparallel.

5. The magnetic recording medium as claimed in claim 4, wherein said non-magnetic coupling layer has a thickness in a range of approximately 0.4 to 1.0 nm when made of a material selected from a group consisting of Ru, Rh, Ir, Cr, Ru alloys, Rh alloys, Ir alloys and Cr alloys, and has a thickness in a range of approximately 1.5 to 2.1 nm when made of a material selected from a group consisting of Cu and Cu alloys.

6. The magnetic recording medium as claimed in claim 1, wherein magnetization directions of the ferromagnetic layer and the magnetic layer are mutually parallel.

7. The magnetic recording medium as claimed in claim 6, wherein said non-magnetic coupling layer has a thickness in a range of approximately either 0.2 to 0.4 nm or 1.0 to 1.7 nm when made of a material selected from a group consisting of Ru, Rh, Ir, Cu, Ru alloys, Rh alloys, Ir alloys and Cu alloys, and has a thickness in a range of approximately either 1.0 to 1.4 nm or 2.6 to 3.0 nm when made of a material selected from a group consisting of Cr and Cr alloys.

8. The magnetic recording medium as claimed in claim 1, wherein said ferromagnetic layer is made of a material selected from a group consisting of Co, Ni, Fe, Ni alloys, Fe alloys, and Co alloys.

9. The magnetic recording medium as claimed in claim 8, wherein said ferromagnetic layer has a thickness in a range of approximately 2 to 10 nm.

10. The magnetic recording medium as claimed in claim 1, wherein said upper and lower magnetic bonding layers are made of a Co alloy selected from a group consisting of CoCrTa, CoCrPt and CoCrPt—M, where M=B, Mo, Nb, Ta, W, Cu or alloys thereof.

11. The magnetic recording medium as claimed in claim 1, wherein said magnetic bonding layer has a thickness in a range of approximately 1 to 5 nm.

12. The magnetic recording medium as claimed in claim 1, wherein said magnetic layer is made of a material selected from a group consisting of Co, Ni, Fe, Ni alloys, Fe alloys, and Co alloys.

13. A magnetic recording medium comprising:
   at least one exchange layer structure and a magnetic layer provided on the exchange layer structure, said exchange layer structure including a ferromagnetic layer and a non-magnetic coupling layer provided on the ferromagnetic layer;
   a lower magnetic bonding layer provided between the ferromagnetic layer and the non-magnetic coupling layer; and
   an upper magnetic bonding layer provided between the non-magnetic coupling layer and the magnetic layer,
   said upper and lower magnetic bonding layers having magnetization directions respectively parallel to the ferromagnetic layer and the magnetic layer,
   an exchange coupling between the upper and lower magnetic bonding layers being larger than an exchange coupling between the magnetic layer and the ferromagnetic layer,
   wherein said at least one exchange layer structure includes at least a first exchange layer structure and a second exchange layer structure provided between the first exchange layer structure and the magnetic layer, said second exchange layer structure having a ferromagnetic layer with a magnetic anisotropy smaller than that of a ferromagnetic layer of the first exchange layer structure, said first and second exchange layer structure having ferromagnetic layers with magnetization directions which are mutually antiparallel.

14. A magnetic storage apparatus comprising:
   at least one magnetic recording medium including at least one exchange layer structure and a magnetic layer provided on the exchange layer structure, said exchange layer structure including a ferromagnetic layer and a non-magnetic coupling layer provided on the ferromagnetic layer,
   a lower magnetic bonding layer provided between the ferromagnetic layer and the non-magnetic coupling layer, and an upper magnetic bonding layer provided between the non-magnetic coupling layer and the magnetic layer,
   wherein said upper and lower magnetic bonding layers are made of a material selected from a group consisting of Fe, Fe alloys, Ni alloys, and Co alloys,
   said upper and lower magnetic bonding layers have magnetization directions respectively parallel to the ferromagnetic layer and the magnetic layer, and
   a Co or Fe concentration of the upper magnetic bonding layer is higher than that of the magnetic layer, and a Co or Fe concentration of the lower magnetic bonding layer is higher than that of the ferromagnetic layer, so that an exchange coupling between the upper and lower magnetic bonding layers is larger than an exchange coupling between the magnetic layer and the ferromagnetic layer.

15. The magnetic recording medium as claimed in claim 8, wherein said ferromagnetic layer is made from a Co alloy selected from the group consisting of CoCrTa, CoCrPt and CoCrPt—M, where M=B, Mo, Nb, Ta, W, Cu or an alloy thereof.

16. The magnetic recording medium as claimed in claim 12, wherein said magnetic layer is made from a Co alloy selected from the group consisting of CoCrTa, CoCrPt and CoCrPt—M, where M=B, Mo, Nb, Ta, W, Cu or an alloy thereof.

17. A magnetic recording medium comprising:
   at least one exchange layer structure and a magnetic layer provided on the exchange layer structure, said exchange layer structure including a ferromagnetic layer and a non-magnetic coupling layer provided on the ferromagnetic layer; and
   a magnetic bonding layer provided between the ferromagnetic layer and the non-magnetic coupling layer,
   wherein said magnetic bonding layer is made of a material selected from a group consisting of Fe, Fe alloys, Ni alloys and Co alloys,
   said magnetic bonding layer has a Co or Fe concentration higher than that of the ferromagnetic layer.

18. The magnetic recording medium as claimed in claim 17, wherein said magnetic bonding layer is made of a material different from those of the ferromagnetic layer and the magnetic layer.

19. The magnetic recording medium as claimed in claim 17, wherein magnetization directions of the ferromagnetic layer and the magnetic layer are mutually antiparallel.

20. The magnetic recording medium as claimed in claim 17, wherein said magnetic bonding layer is made of a Co alloy selected from a group consisting of CoCrTa, CoCrPt and CoCrPt—M, where M=B, Mo, Nb, Ta, W, Cu or alloys thereof.

21. The magnetic recording medium as claimed in claim 17, wherein said magnetic bonding layer has a thickness in a range of approximately 1 nm to 5 nm.

22. A magnetic recording medium comprising:
   at least one exchange layer structure and a magnetic layer provided on the exchange layer structure, said exchange layer structure including a ferromagnetic layer and a non-magnetic coupling layer provided on the ferromagnetic layer; and
   a magnetic bonding layer provided between the magnetic layer and the non-magnetic coupling layer,
   wherein said magnetic bonding layer is made of a material selected from a group consisting of Fe, Fe alloys, Ni alloys and Co alloys,
   said magnetic bonding layer has a Co or Fe concentration higher than that of the magnetic layer.

23. The magnetic recording medium as claimed in claim 22, wherein said magnetic bonding layer is made of a material different from those of the ferromagnetic layer and the magnetic layer.

24. The magnetic recording medium as claimed in claim 22, wherein magnetization directions of the ferromagnetic layer and the magnetic layer are mutually antiparallel.

25. The magnetic recording medium as claimed in claim 22, wherein said magnetic bonding layer is made of a Co alloy selected from a group consisting of CoCrTa, CoCrPt and CoCrPt—M, where M=B, Mo, Nb, Ta, W, Cu or alloys thereof.

26. The magnetic recording medium as claimed in claim 22, wherein said magnetic bonding layer has a thickness in a range of approximately 1 nm to 5 nm.

* * * * *